(12) United States Patent
Fembleaux

(10) Patent No.: US 7,782,711 B2
(45) Date of Patent: Aug. 24, 2010

(54) PEST DETERRENT

(76) Inventor: Richard Fembleaux, 230 W. Parkway, Unit 11, Pompton Plains, NJ (US) 07444

( * ) Notice: Subject to any disclaimer, the term of this patent is extended or adjusted under 35 U.S.C. 154(b) by 0 days.

(21) Appl. No.: 11/962,312

(22) Filed: Dec. 21, 2007

(65) Prior Publication Data

US 2009/0161489 A1    Jun. 25, 2009

(51) Int. Cl.
    *H04B 1/02*    (2006.01)
(52) U.S. Cl. ..................................... 367/139
(58) Field of Classification Search ............. 367/139; 43/1, 121, 124, 131, 132.1; 119/719; 116/22 A; 340/384.2
    See application file for complete search history.

(56) References Cited

U.S. PATENT DOCUMENTS

| | | | | |
|---|---|---|---|---|
| 4,943,953 A * | 7/1990 | Kafi | ............................ | 367/139 |
| 5,205,066 A * | 4/1993 | Jan | ............................ | 367/139 |
| 5,224,438 A * | 7/1993 | Buss | .......................... | 116/22 A |
| 5,822,917 A * | 10/1998 | Jan | ............................ | 116/22 A |
| 5,870,847 A * | 2/1999 | Hsiao | .......................... | 367/139 |
| 6,000,169 A * | 12/1999 | Jan | ............................... | 43/124 |
| 6,134,827 A * | 10/2000 | Jan | ............................... | 43/124 |
| 6,157,594 A * | 12/2000 | Jan | ............................ | 367/139 |
| D468,259 S * | 1/2003 | Garrity et al. | ............. | D13/119 |
| D590,909 S * | 4/2009 | Fembleaux | ................ | D22/120 |
| 2002/0040783 A1* | 4/2002 | Zimmerman et al. | ........ | 166/366 |
| 2007/0070620 A1* | 3/2007 | Theriault et al. | ............. | 362/188 |
| 2008/0156279 A1* | 7/2008 | Weiser et al. | ................ | 119/719 |

FOREIGN PATENT DOCUMENTS

JP        06245683 A  *  9/1994

OTHER PUBLICATIONS

Sweeney's Mole & Gopher Sonic Spikes, http://www.wrsweeney.com/mole_gopher_products.php?product=spikes, © 2006-2009 Senoret Chemical Company, one page.*

* cited by examiner

*Primary Examiner*—Dan Pihulic
(74) *Attorney, Agent, or Firm*—Marguerite Del Valle

(57) ABSTRACT

An improved in-ground pest deterrent composed of a hollow plastic spike which houses a sonic pulse producer and is battery powered in which the sonic pulse producing circuitry is fixed and shielded within the housing such that when a removable battery sleeve is removed, the sonic pulse producing circuitry remains within the housing.

5 Claims, 2 Drawing Sheets

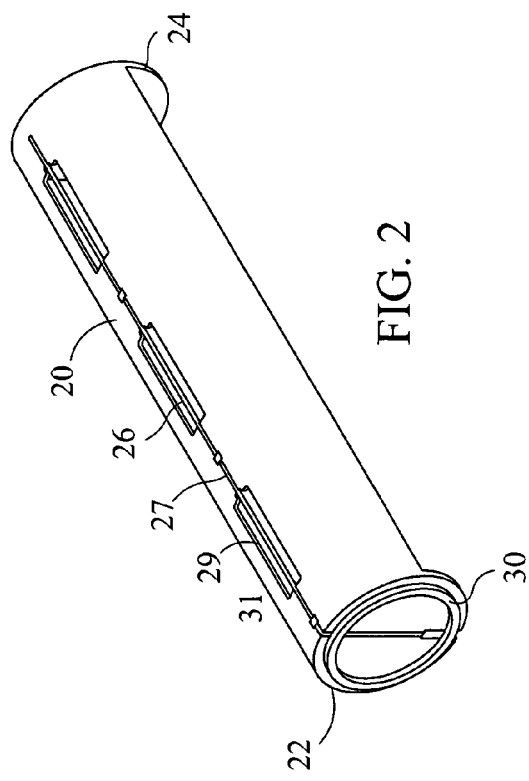
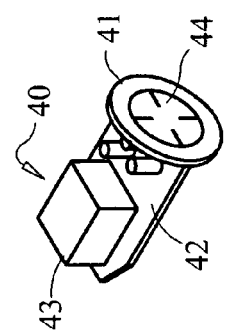
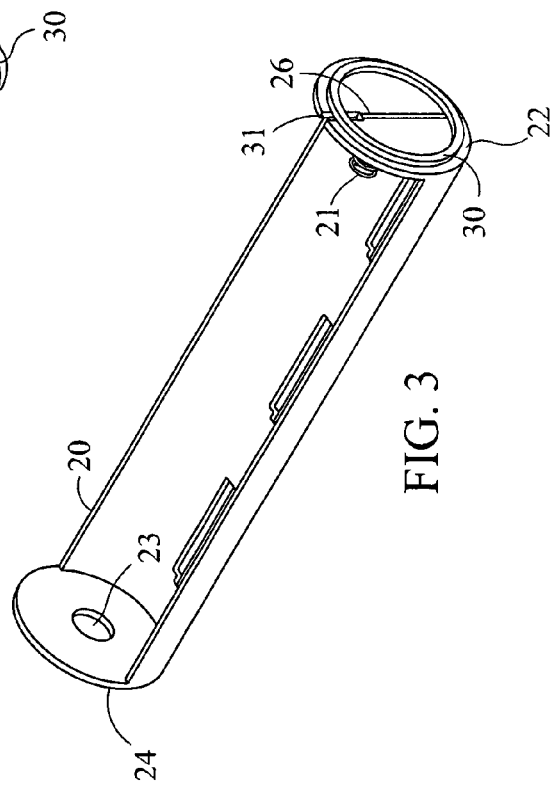

PEST DETERRENT

This invention relates to an improved configuration for an in-ground pest deterrent which protects lawns from the damage caused by ground burrowing vermin, such as moles, voles, and gophers, by sending sonic pulses into the surrounding ground, causing a disagreeable environment for the sonic-sensitive vermin, thus driving the pests away from the protected area. The inventive configuration protects sensitive circuitry from exposure and also enhances efficiency of sonic pulse transmission.

BACKGROUND OF THE INVENTION

Ground rodents can cause major damage to lawns, golf links, racecourses and farms. These animals are burrowers. They feed on the earthworms and insects they find in their tunnels and in the earth. They need to consume about half their own weight daily, thus they are extremely active in their search for food. They use their powerful and efficient front feet as shovels to create a network of underground tunnels. This burrowing often damages the root systems of landscaping shrubs and trees, killing young specimens or causing them to lean; it also damages crops, flower bulbs, and root vegetables. The soil that is excavated during this process is often left as unsightly mounds. In addition, some species create unattractive runways in lawns by eating grass blades and passing numerous times over the same path. Molehills and tunnel holes can trip up horses and cattle. Stones thrown up by the moles can wreck farm machinery. The tunneling may also damage plastic water lines and other underground installations. Abandoned tunnels often divert water leading to soil erosion.

Moles and the like have acute hearing and highly sensitive noses and tails. Sending sonic signals into the ground has been shown to be effective in decreasing ground rodent activity. It is thought that sonic pulses in the ground are offensive to the animals' acute hearing and sense of touch and that such action interferes with their food-finding abilities. When disturbed to a great enough extent, they will leave the area of the in-ground sonic activity to seek more hospitable environment.

The prior art includes a number of references which disclose devices utilizing sonic waves to repel ground burrowing vermin. They all utilize, in some configuration, a removable battery chamber to which is also attached the circuitry and sonic generating means. Among these references are U.S. Pat. Nos. 5,205,066; 5,822,917; 5,870,847; and 6,157,594. The method of use of these devices is the same. The devices are switched on and inserted into the ground to generate sound waves through the area. They typically remain in the ground for an extended period of time, during which devices become covered with dirt and other debris. When the battery wears out, the person charged with the maintenance of the system has to locate the device, which often requires digging into the ground by hand. Then he has to remove the dirt-covered cap, and lift out the interior frame which contains the batteries and the sonic generating equipment. He then replaces the spent batteries, inserts the frame back into the housing, and the tightens the cap. All this manipulation of the interior workings of the device is usually accomplished with dirt-covered hands. It is during this battery changing event that the main drawback of these devices is triggered: the sonic generating equipment becomes exposed to and damaged by dirt and the elements.

Another drawback to the prior art designs is the reduced efficiency of sonic transmission due to the fact that the sonic generating equipment is attached to the battery chamber. Because the battery chamber is removable, i.e., not fixed to the housing, some of the energy produced by the sonic generator is absorbed by the battery chamber, and therefore dissipated within the housing.

SUMMARY OF THE INVENTION

The present invention is an improved in-ground pest deterrent composed of a hollow plastic spike which houses a sonic pulse producer and is battery powered. Unlike prior art devices, the sonic pulse producing circuitry is fixed and shielded within the housing such that when a removable battery sleeve is removed, the sonic pulse producing circuitry remains within the housing. This inventive configuration enables the change of batteries while leaving the circuitry protected within the unit. This improvement over the prior art reduces the chance of corrosion and damage to the circuitry, in that the circuitry remains shielded in the housing rather than exposed to contamination during battery changes. It also results in more efficient transfer and penetration of the sonic energy into the ground, since the circuitry is fixed directly to the housing, which is itself in direct contact with the ground. This is an advantage over prior art devices in which the circuitry was integral with the removable battery chambers. Such prior art devices allowed sonic energy to be absorbed to a large extent by the battery chambers instead of directing the energy to penetrate ground.

The object of this invention is to provide a pest repeller that keeps the sonic pulse producing circuitry protected from contamination and damage from the elements. A further object of the invention is to provide a pest repeller that transmits sonic pulses efficiently into the surrounding ground.

DESCRIPTION OF THE DRAWINGS

FIG. 2 is a top rear perspective view of the battery sleeve.

FIG. 3 is a top front perspective view of the battery sleeve.

FIG. 4 is a perspective view of the disk that forms the lid of the sonic pulse producing unit.

DETAILED DESCRIPTION OF THE INVENTION

Figure 1:
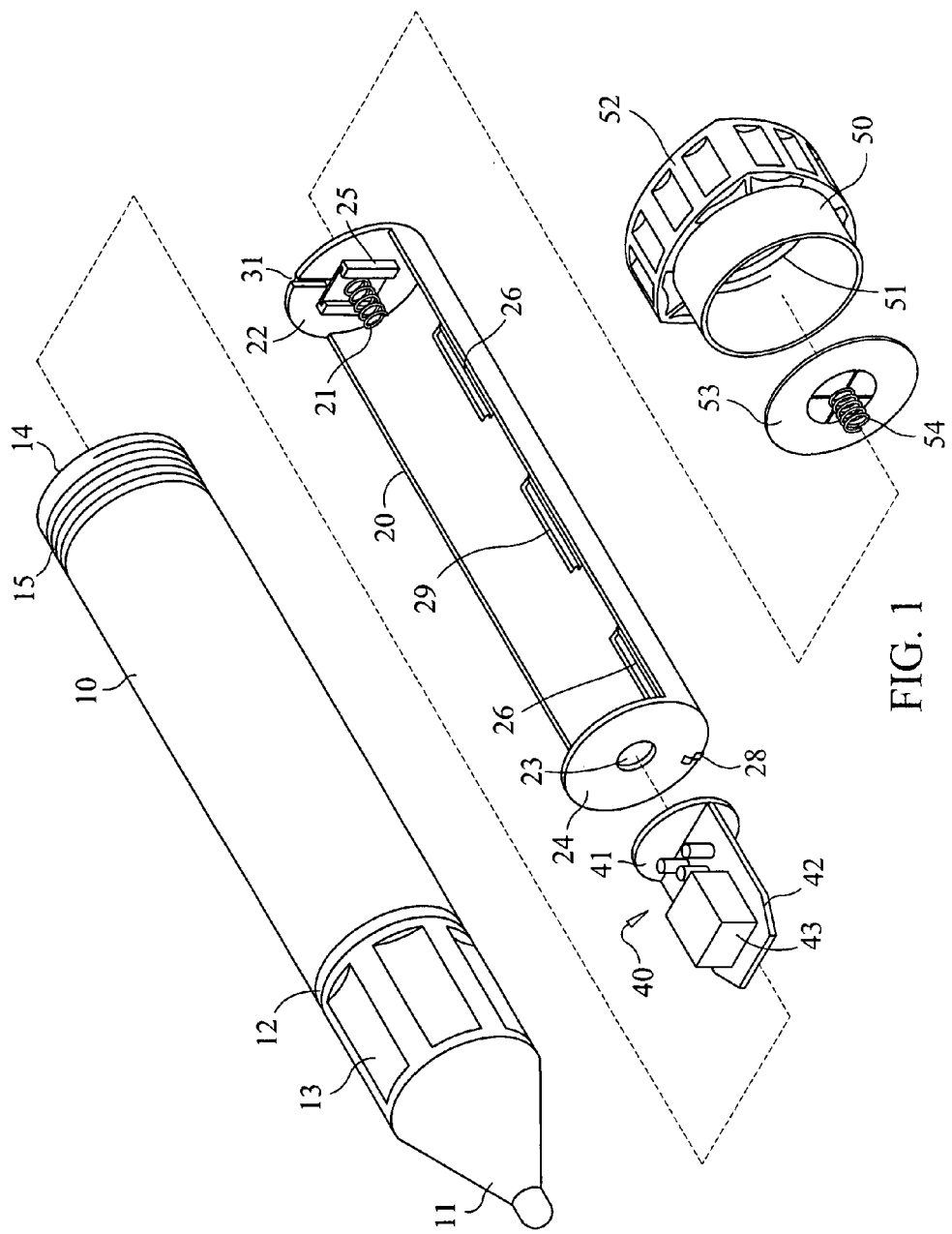
FIG. 1 is an exploded front perspective view of the repeller of the present invention.

FIGS. 1-4 show a preferred embodiment of the device of the present invention. A thin-walled housing 10 has a conical end 11, an engraved notch 12 around the circumference of the housing near conical end 11, a series of indentations 13 between notch 12 and conical end 11, an open end 14, and outer threads 15 near open end 14.

Battery sleeve 20 is a hemi-cylindrically shaped compartment, having a spring 21 and a slot 31 at one end 22 and an aperture 23 at the other end 24. Spring 21 is in contact with a metal tab 25 to which one end of a wire 26 is connected. As shown in FIG. 2, wire 26 runs the length of battery sleeve 20, from end 22 along a groove 27 to end 24 where it is joined to a metal contact tab 28. Battery shaped holes 29 can be cut into battery sleeve 20 as shown so as to indicate the correct orientation of batteries to be inserted. A ring 30 or other pullable element is attached at end 22 to assist in removing battery sleeve 20 from housing 10.

Sonic pulse producing unit 40 is shown in FIGS. 1 and 4 and is composed of a disk 41 that is permanently fixed in the interior of housing 10 by snapping it into notch 12. Attached to disk 41 is a printed circuit board 42 as well as sound generating components, including a buzzer 43, resistors, capacitors, and transistors. The circuit board is cut to a shape to fit closely into the conical end 11 so that the edges contact the housing to a large extent. The arrangement of these components on the board is dependent on the configuration of the tip and size of the buzzer and is within the skill of the art. A metal contact 44 extends through disk 41 such as to transmit energy from the battery source to the components of the sonic producing unit 40. When power is supplied to buzzer 43, pulses of about 400 Hz will sound having a duration of 2 seconds repeated every 15 seconds in an endless cycle. The details of constructing a sonic pulse generating unit are well known in the art and will not be claimed nor furthered recited here.

Cap 50 is a cylindrical cap having inner threads 51 and an outer collar 52 that is configured to provide an easily graspable surface, such as the multiply-indented, softly rounded triangle shape shown. Rubber washer 53, is fit into cap 50 to provide a compressible surface into which the walls of housing 10 can form a seal when cap 50 is screwed onto housing 10. Spring 54 extends from the center of the washer, against end 22 such that it exerts a downward force to cause the battery sleeve 20 to maintain a connection with contact 44 when the device is sealed.

To assemble, sonic pulse producing unit 40 is snapped into housing 10; batteries (not shown) are inserted into battery sleeve 20 and battery sleeve 20 is slid into housing 10; cap 50 is screwed onto housing 10 to seal it.

To operate, a wooden or steel rod or stake (not shown) is used to make a pilot hole in the ground. The assembled device is then inserted into the ground where it will repel ground rodents. The device can be used with the cap extending out of the ground or inserted such that the top of the cap is flush with the surface of the ground.

The invention claimed is:

1. A pest repeller comprising:
   a. an elongated thin-walled housing having a conical tip and an open end;
   b. a removable battery-containing sleeve within said housing;
   c. a stationary sonic pulse generator closely fixed and shielded within said conical tip, and adjoining the sleeve such as to receive continual power; and
   d. a removable cap having a sealing mechanism and which closely fits and covers the open end of the housing.

2. A pest repeller as claimed in claim 1 wherein the sonic pulse generator is comprised of a printed circuit board and a buzzer.

3. A pest repeller as claimed in claim 2 wherein the printed circuit board is cut to contact the housing.

4. A pest repeller as claimed in claim 1 wherein the housing is plastic.

5. A pest repeller as claimed in claim 1 wherein the sealing mechanism is a compressible rubber washer.

* * * * *